United States Patent
Radeljak et al.

(10) Patent No.: US 9,970,316 B2
(45) Date of Patent: May 15, 2018

(54) INSTRUMENTED AIRFOIL

(71) Applicant: SNECMA, Paris (FR)

(72) Inventors: Gabrijel Radeljak, Torcy (FR); Pascal Couhier, Saint Fargeau Ponthierry (FR); Benedicte Leleu, Paris (FR); Frederic Raymond Jean Miroudot, Bry sur Marne (FR); Sebastien Hameau, Lieusaint (FR); Antoine Jean Jausovec, Tournan en Brie (FR)

(73) Assignee: SNECMA, Paris (FR)

( * ) Notice: Subject to any disclaimer, the term of this patent is extended or adjusted under 35 U.S.C. 154(b) by 738 days.

(21) Appl. No.: 14/514,784

(22) Filed: Oct. 15, 2014

(65) Prior Publication Data

US 2015/0110602 A1 Apr. 23, 2015

(30) Foreign Application Priority Data

Oct. 21, 2013 (FR) ..................... 13 60248

(51) Int. Cl.
*F01D 17/08* (2006.01)
*F01D 21/00* (2006.01)
(Continued)

(52) U.S. Cl.
CPC ............. *F01D 21/003* (2013.01); *F01D 9/02* (2013.01); *F01D 17/02* (2013.01); *F01D 17/085* (2013.01);
(Continued)

(58) Field of Classification Search
CPC ........ F01D 17/02; F01D 17/08; F01D 17/085; F01D 21/003
See application file for complete search history.

(56) References Cited

U.S. PATENT DOCUMENTS 2,946,221 A * 7/1960 Annear .................. F01D 21/003
73/861.65
4,244,222 A * 1/1981 Hoyer ..................... F01D 17/02
136/230
(Continued)

FOREIGN PATENT DOCUMENTS

| EP | 0 186 609 A2 | 7/1986 |
| GB | 2 111 221 A | 6/1983 |
| GB | 2 452 026 A | 2/2009 |

OTHER PUBLICATIONS

French Preliminary Search Report dated Jun. 27, 2014, in French Application No. 13 60248 filed Oct. 21, 2013 (with Written Opinion and English Translation of Categories of Cited Documents).

*Primary Examiner* — Justin Seabe
(74) *Attorney, Agent, or Firm* — Oblon, McClelland, Maier & Neustadt, L.L.P.

(57) ABSTRACT

The invention relates to an instrumented airfoil for mounting in a flow passage through a turbine, compressor, or module of a turbine engine. An instrumentation member is attached to an airfoil and includes information-obtaining means received in a cutout formed in the airfoil and projecting relative to the leading edge or the trailing edge. According to the invention, the instrumentation member also comprises a holder portion that is united with the information-obtaining means and that is attached to the cutout in such a manner that its surface is in alignment respectively with the suction side wall, the pressure side wall, and the leading edge or the trailing edge of the airfoil, the transitions between these respective surfaces not presenting any setbacks.

16 Claims, 2 Drawing Sheets

(51) Int. Cl.
*F01D 25/28* (2006.01)
*F01D 9/02* (2006.01)
*F04D 27/00* (2006.01)
*F01D 17/02* (2006.01)

(52) U.S. Cl.
CPC ......... *F01D 25/285* (2013.01); *F04D 27/001* (2013.01); *F05D 2220/323* (2013.01); *F05D 2230/60* (2013.01); *F05D 2260/12* (2013.01); *F05D 2260/83* (2013.01); *Y02T 50/671* (2013.01); *Y10T 29/49323* (2015.01)

(56) References Cited

U.S. PATENT DOCUMENTS

| | | | | |
|---|---|---|---|---|
| 4,433,584 | A | * | 2/1984 | Kokoszka ............ G01L 19/0007 73/861.66 |
| 4,605,315 | A | | 8/1986 | Kokoszka et al. |
| 4,765,751 | A | * | 8/1988 | Pannone .................. F01D 17/02 374/135 |
| 2011/0264413 | A1 | * | 10/2011 | Stankowski ............ B23P 6/005 703/1 |
| 2014/0182292 | A1 | * | 7/2014 | Hudon .................. F01D 21/003 60/722 |

\* cited by examiner

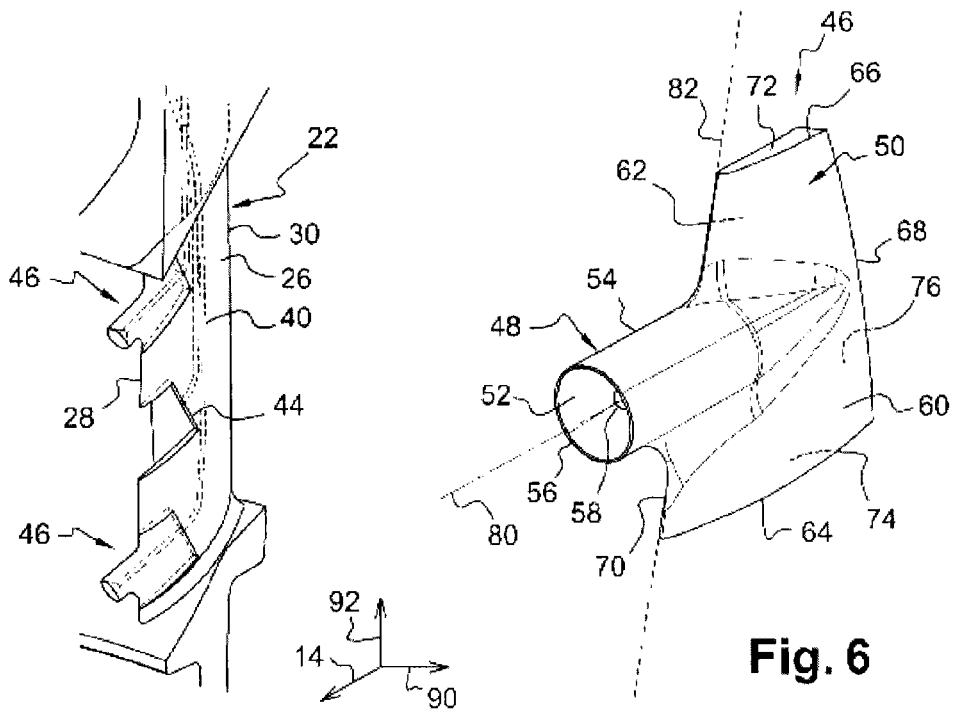
Fig. 5
Fig. 6
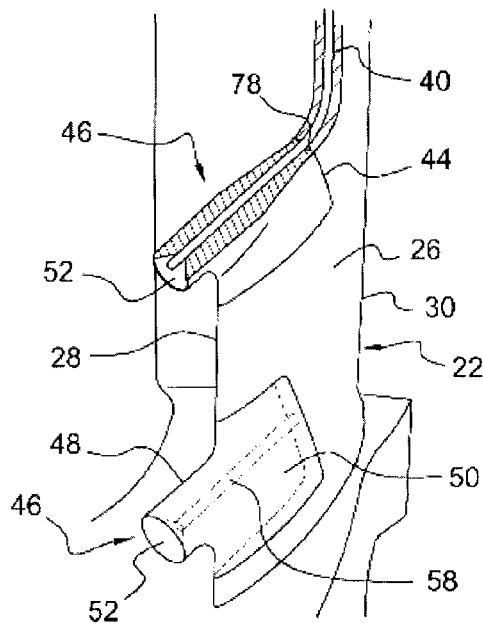
Fig. 7

INSTRUMENTED AIRFOIL

The invention relates to an instrumented airfoil for a compressor or for a turbine or for a module forming part of a turbine engine, such as in particular an airplane turbojet, and to a method of fabricating the instrumented airfoil.

In general, a turbine engine has an annular passage extending around and along a main axis of the engine, and through which air flows from upstream to downstream relative to the engine along the axis, passing successively through compressor stages, a combustion chamber, and turbine stages of the engine. Both the compressor and the turbine stages are made up of annular rows of stationary vanes, referred to respectively as guide vane sets or as nozzles, and they direct the air stream to downstream annular rows of rotary blades, exchanging the energy contained in the stream with a shaft running along the axis of the engine. Each rotary blade or stationary vane comprises an airfoil extending radially across the passage through the engine, and having an upstream leading edge and a downstream trailing edge.

In order to satisfy needs to collect information about the internal aerodynamic operation of an engine, it is commonly necessary to place measurement instruments or sensors, such as pressure or temperature sensors, on the airfoils of the stationary vanes or the rotary blades within the engine, either directly or else within a partial test module of the engine that is used for experimental testing.

Such sensors are generally incorporated by adhesive bonding or brazing (depending on the temperature levels encountered by the airfoils during testing) an instrumentation member in the leading edge of an airfoil. The measurement member generally consists of a nozzle for taking a sample from the stream, the nozzle being brazed or adhesively bonded in a cutout of complementary shape formed in the leading edge of an airfoil of a stationary vane or a rotary blade. The intake orifice of the nozzle generally projects from the upstream portion of the leading edge so that the sample is taken from the stream where it is free from aerodynamic disturbances caused by the airfoil.

That implantation technology is appropriate when the airfoil is of sufficient thickness to enable the nozzle to be properly held in the cutout in the leading edge. Furthermore, under such circumstances, the deformation of the leading edge caused by the presence of the nozzle has little effect on the general aerodynamic behavior of the airfoil, and therefore does not disturb the operation of the engine.

Nevertheless, with airfoils of small thickness, such that the nozzle projects for example outwards from both sides of the leading edge of the airfoil when it is arranged in the cutout, the surface area for brazing or adhesive between the airfoil and the nozzle is too small to ensure that the nozzle is held properly without running any risk of breakage during testing. Furthermore, the influence of the nozzle on the general shape of the profile of the leading edge has a much greater effect on the general aerodynamic behavior of the airfoil, such that unwanted aerodynamic disturbances are generated downstream from the leading edge.

For such airfoils of small thickness, a known solution consists in making the airfoil and the measurement members in the leading edge as a single piece, e.g. a piece machined from a mass of material. The problem of holding the nozzle then no longer arises, and the overall aerodynamic profile is easily worked. Nevertheless, programming a machine tool to cut out nozzles then becomes very complex, thereby considerably increasing the time and the cost of making such a part. That solution is consequently used only very rarely, in spite of its technical advantages.

The present invention provides a solution to those problems that is simple, effective, and inexpensive.

For this purpose, the invention proposes an instrumented airfoil for mounting in a flow passage through a turbine engine turbine, compressor, or module, the airfoil comprising:

an airfoil defined in a lateral direction respectively by a suction side wall and by a pressure side wall, these walls joining together at their ends in an axial direction via two respective lines extending in a direction that is substantially longitudinal so as to form a leading edge and a trailing edge respectively at their ends, the airfoil also including a cutout extending axially from the leading edge or the trailing edge and laterally between the suction side wall and the pressure side wall; and an instrumentation member that is attached to the airfoil and that includes information-obtaining means projecting from the cutout relative to the leading edge or the trailing edge;

the airfoil being characterized in that said instrumentation member further comprises a holder portion that is united with the information-obtaining means, that extends the leading edge or the trailing edge of the airfoil, and/or that is attached to the cutout in such a manner that said holder portion presents respective surfaces in alignment with the suction side wall, the pressure side wall, and trailing or leading edge of the airfoil, with the transitions between these respective surfaces not presenting any setbacks.

The holder portion that holds the information-obtaining means of the instrumentation member may present a surface area for attachment in the cutout in the airfoil that is greater than the area presented by the information-obtaining means on their own. It is therefore possible to increase the size of the cutout in the airfoil compared with the prior art, and to arrange the holder portion in the cutout in such a manner that the attachment, e.g. by brazing or by adhesive, between the airfoil and the instrumentation member, including the holder module, takes place via a surface area that is greater than in the prior art, thus enabling the instrumentation member to be held mechanically to the airfoil during testing in a manner that is more secure. In particular, when the airfoil is finer than the information-obtaining means, and thus when it is difficult to provide good mechanical retention for these means if they are arranged directly on the leading edge or the trailing edge of the airfoil, the above-described instrumented airfoil is particularly advantageous since the holder portion allows the information-obtaining means that are united therewith to be put into place in such a manner as to enable the desired testing to be performed.

The holder portion as described in the present document also makes it possible to shape as well as possible the instrumentation member so that it matches as closely as possible the shape of the airfoil before the cutout was made. The holder portion thus provides an acceptable aerodynamic transition between the information-obtaining means and the airfoil, thus making it possible to avoid disturbances in the stream downstream from the instrumentation member.

This solution thus makes it possible to obtain the same technical advantages as in the one-piece instrumented airfoil in the prior art, as machined in a mass of material, but without having the drawbacks inherent to the cost and the time required for making it. This achieves a saving in time on the cycle for producing an instrumented airfoil, since the design and the installation of the instrumentation member are independent of the shaping and the machining of the airfoil.

According to another characteristic of the invention, the airfoil includes a channel for conveying information obtained by the information-obtaining means, said channel being connected to the instrumentation member via the cutout.

This channel serves to convey the information that has been obtained by the means of the instrumentation member to elements that are external to the airfoil, and which may interact with the person carrying out testing.

This information-conveying channel may be situated either outside the airfoil and be attached to the airfoil via bridges, or else on the surface of the airfoil, or indeed inside the airfoil.

It is more advantageous to form the channel inside the airfoil since the assembly comprising the airfoil and the channel can then be made as a single piece when performing the method of fabricating the airfoil. Furthermore, the channel is then not exposed to the stream flowing around the airfoil during testing.

Advantageously, the cutout is formed in the leading edge of the airfoil, and the information-obtaining means comprise a measurement nozzle for taking a fluid from upstream of the leading edge of the airfoil. The fluid taken from upstream of the leading edge can then be measured in relatively accurate manner since it has not been subjected to disturbances from the airfoil.

The nozzle may serve to obtain temperature information or pressure information relating to the fluid.

In an embodiment, the measurement information conveyed by the information-conveying channel may be carried by the fluid taken by the nozzle, which communicates freely with the information-conveying channel.

In another embodiment, the measurement information conveyed by the information-conveying channel may be carried by an electric cable connected to the nozzle.

In an embodiment presenting particular advantages, the holder portion of the instrumentation member is thinner than the nozzle in the lateral direction of the instrumented airfoil.

As explained above, the holder portion then enables the information-obtaining means to be held securely during testing and makes it possible to work on the aerodynamic profile of the instrumented airfoil so as to avoid generating undesirable disturbances.

Preferably, the instrumentation member is welded, brazed, or adhesively bonded in the cutout of the airfoil.

According to another characteristic of the invention, the information-obtaining means and the holder portion are formed as a single piece.

The invention also provides a turbine engine turbine, compressor, or module, including an instrumented airfoil as described above.

The invention also provides an instrumentation member comprising a nozzle configured to take a fluid at a first axial end of the nozzle, characterized in that a holder portion formed integrally with the nozzle extends from a second axial end of the nozzle so as to form a shoulder with the nozzle in a direction that is substantially perpendicular to the axis, the instrumentation member being intended in particular to form a portion of the leading edge of the instrumented airfoil as described above.

Finally, the invention provides a method of making an instrumented airfoil as described above, the method comprising the steps consisting in:

cutting out a portion from an airfoil defined in a lateral direction respectively by a suction side wall and by a pressure side wall, these walls joining together at their ends in an axial direction via two respective lines extending in a direction that is substantially longitudinal, so as to form respectively at said ends a leading edge and a trailing edge, the cutout extending axially from the leading edge or the trailing edge and extending laterally in full between the suction side wall and the pressure side wall;

forming an instrumentation member for attaching to the cutout and including information-obtaining means that are to project from the cutout relative to the leading edge or to the trailing edge, the instrumentation member further comprising a holder portion united with the information-obtaining means and having a shape in the vicinity of the cutout that reproduces the shape of the portion that has been cut out from the airfoil; and attaching the instrumentation member to the airfoil by arranging the holder portion in the cutout in the airfoil so that in the vicinity of the cutout the holder portion reproduces the shape that the airfoil had prior to the cutting-out step.

Advantageously, this method of making an instrumented airfoil is characterized in that the airfoil and/or the instrumentation member are made, prior to attaching, by laser melting, preferably in a single laser melting pass. The instrumentation member is then made simultaneously on the same melting plate as the airfoil.

It is also possible to envisage forming only the instrumentation member by laser melting, and then to attach it to an airfoil obtained by some other method.

It should be recalled that laser melting is an additive fabrication process in which metal powder is delivered and melted using a laser, in order to produce functional three-dimensional parts.

Other advantages and characteristics of the invention appear on reading the following description made by way of non-limiting example and with reference to the accompanying drawings, in which:

FIG. 5 is a perspective view of an instrumented airfoil of the invention;

FIG. 6 is a perspective view of an instrumentation member of the invention; and

FIG. 7 is a perspective view in section of an instrumented airfoil of the invention.

Figure 1:
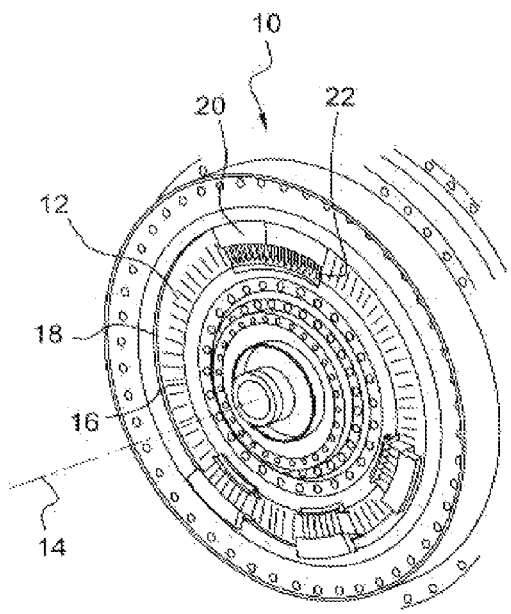
FIG. 1 is a perspective view of a turbine engine module comprising a stage of rotary blades (or stationary vanes)

FIG. 1 shows a turbine engine stage 10 situated in a compressor or a turbine. An annular passage 12 for passing a flow of fluid from upstream to downstream extends circumferentially around and parallel to the axis 14 of the turbine engine. The passage 12 is defined internally and externally by respective annular walls 16 and 18. An annular row of rotary blades or stationary vanes, 20, is mounted across the passage, each rotary blade or stationary vane comprising an airfoil 22 extending in a radial or longitudinal direction across the passage 12 and interacting with the fluid. An airfoil 22 has two walls, respectively a pressure side wall 24 and a suction side wall 26 forming the limits of the airfoil in the circumferential or lateral direction 90, these walls extending longitudinally across the passage and joining together upstream so as to form the leading edge 28 of the airfoil, and downstream so as to form the trailing edge 30 of the airfoil. Depending on the stage in which these airfoils are mounted, they may be stationary (i.e. vanes), or they may be mounted to rotate in the passage (i.e. blades).

In order to study the flow of fluid in the passage 12, it is advantageous to provide the airfoils 22 with instrumentation means for obtaining information during testing of the turbine engine or of a turbine engine module. The information can then be transmitted to a user for analysis in real time or in deferred time. By way of example, this information may consist in the temperature of the fluid, in its pressure, or in any other measurable parameter in the passage.

Figure 2:
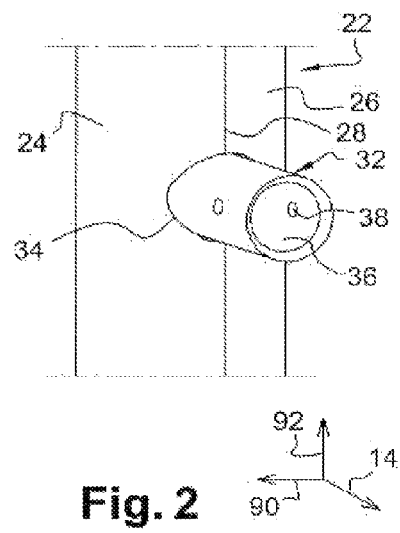
FIG. 2 is a perspective view of a conventional instrumented airfoil of the prior art.

For a conventional airfoil, it is known, as shown in FIG. 2, to form a cutout 34 in the form of an orifice, also referred to as a countersink, in the leading edge 28 of an airfoil in order to arrange an instrumentation member therein substantially axially, by brazing or by adhesive, depending on the temperature level encountered by the airfoil in operation, which instrumentation member consists solely in a nozzle 32 for sampling the fluid to deliver information concerning pressure or temperature. The nozzle 32 is substantially in the form of a straight tube, and it extends upstream so as to project from the leading edge 28, thereby interrupting its continuity, in order to take samples through an inlet orifice 36 of the fluid in the passage that is flowing towards the airfoil, the samples being taken upstream from where the fluid is subjected to disturbances caused by the airfoil 22. The nozzle may also include holes 38 in its outer wall for the purpose of stabilizing the fluid inside it. A channel 40 for conveying the information taken by the nozzle 32 is formed inside the airfoil 22 and connects the nozzle 32 to measurement means external to the airfoil.

Figure 3:
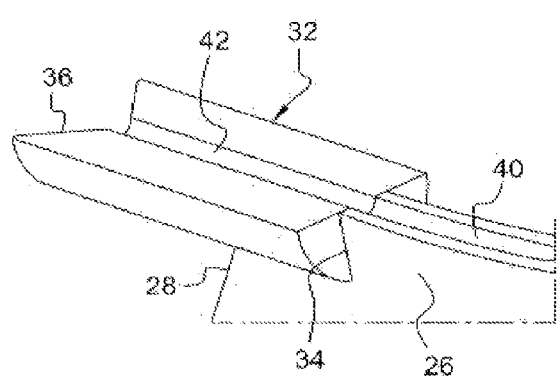
FIG. 3 is a perspective view of a section of an instrumented fine airfoil of the prior art.
Figure 4:
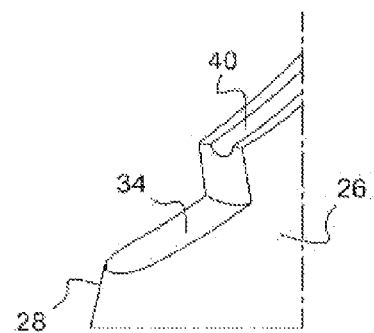
FIG. 4 is a perspective view of a section of the airfoil shown in FIG. 3 and used for receiving an instrumentation member.

FIGS. 3 and 4 show the same mounting technique as for prior art of FIG. 2, but with an airfoil that is fine, i.e. that presents small lateral thickness between its pressure side wall 26 and its suction side wall 24. It should be observed that, as an alternative, FIG. 3 shows a nozzle 32 having an inlet orifice 36 that is in the form of a funnel and that is extended by a channel 42 extending along the axis of the nozzle 32 and connected to the information-conveying channel 40 of the airfoil. In this embodiment, the nozzle 32 presents a lateral dimension that is greater than that of the portion of the airfoil 22 in the vicinity of the leading edge 28 where it is installed. The cutout 34 formed in the leading edge of the airfoil then opens out laterally both into the suction side wall 24 and into the pressure side wall 26, such that the cutout 34 occupies the entire lateral direction starting from the leading edge 28 and presents a section that is U-shaped, such that the nozzle 32 projects laterally from the airfoil 22 on both sides of the cutout 34 in which it is bonded by adhesive or by brazing. Thus, the nozzle 32 is attached to the airfoil 22 via an area that is relatively small, corresponding to the area of the cutout 34. This embodiment is used in the prior art and it presents the drawbacks mentioned above in this application.

It is proposed to mitigate those drawbacks by using an instrumented airfoil of the invention that is particularly suitable for fine airfoils, with an embodiment thereof being described with reference to FIGS. 5, 6, and 7.

The U-shaped cutout 44 made in the airfoil is larger than in the prior art, so that it extends further into the airfoil 22 from the leading edge 28 along the longitudinal direction 92 and/or along the axial direction 14 of the airfoil, and so that it occupies the entire lateral width of the airfoil, thus projecting both from the suction side wall 26 and from the pressure side wall 24. Thus, the area of the cutout 44 is greater than in the prior art. An information-conveying channel 40 is formed inside the airfoil and opens out into the cutout 44. It should be observed that the information-conveying channel may equally well be formed by a groove in the surface of the airfoil, or by a duct arranged on the outside of the airfoil and held thereto by bridges.

In addition to the information-obtaining means, which in the figures are constituted by a nozzle 48 of the same type as the nozzles known in the prior art and projecting from the leading edge of the instrumented airfoil in order to take samples of fluid, the instrumentation member 46 of the invention, that is attached to the cutout 44, includes a holder portion 50 that is united with the nozzle 48 on its side remote from the orifice 52 of the nozzle. Thus, the nozzle 52 is not attached directly to the cutout 44 in the airfoil 22 as in the prior art, but is united with said holder portion 50 that is structurally independent of the airfoil 22. In the embodiment of the invention shown in the figures, the holder portion 50 and the nozzle 48 are formed as a single part, thus making it easy to form the transition surface between the nozzle and the holder portion in a manner that is appropriate for the aerodynamic constraints that need to be satisfied by the instrumented airfoil. For this purpose, this transition surface between the nozzle 48 and the holder portion 50 is progressive and smooth, and it does not present any set back, discontinuity, edge, or cutout that could create unwanted disturbance once the instrumentation member 46 is attached to the airfoil.

The holder portion 50 is made so as to present a shape that reproduces, copies, or imitates the shape of the portion previously cut out from the airfoil 22, and more particularly its shape in the vicinity of the cutout 44 that is made therein, i.e. in the vicinity or the proximity of the cutout 44.

Thus, when the instrumentation member 46 is attached to the airfoil 22 by arranging the holder portion 50 in the cutout 44 in the airfoil, and by bonding them together by brazing or adhesive, the holder portion 50 fits closely to the shape of the cutout 44 and in the vicinity of the cutout 44 it reproduces the shape that the airfoil 22 had before the cutting-out step.

Using this installation method, it can be seen that the resulting instrumented airfoil can possess the following characteristics as shown in the figures:

the holder portion is attached to the airfoil 22 so as to hold the nozzle 48 upstream from the instrumented airfoil;

in addition, the holder portion 50 is attached to the cutout 44 so that its own surface extending the surface of the nozzle 48 and for coming into contact with the fluid in the passage 12 is in alignment respectively with the suction side wall 26 and pressure side wall 24 and with the leading edge 28 of the airfoil, with the transitions between these respective surfaces being smooth and progressive and not presenting any set back, discontinuities, cutouts, or edges that could generate aerodynamic disturbances, being similar to the portion of the airfoil that was previously cut away; and a direct consequence that stems from the situation shown where the cutout 44 possesses a longitudinal dimension greater than that of the nozzle 48, in that the holder portion 50 extends the leading edge 28 of the airfoil radially between the cutout 44 and the nozzle 48 so as simultaneously to fill in the additional space left between the cutout 44 and the nozzle 48, in comparison with the prior art.

These characteristics can be found in part or in full in the instrumented airfoil of the invention.

Since the U-shaped cutout 44 that extends into the airfoil from the leading edge is greater than in the prior art, the holder portion 50 that is attached along this cutout 44 by brazing or by adhesive is held more securely than a prior art nozzle 32 attached directly in a cutout 34. The instrumented airfoil therefore no longer presents any risk of breaking in operation at the attachment between the airfoil 22 and the instrumentation member 46. Furthermore, the various transitions that are present between the nozzle 48, the holder portion 50, and the airfoil 22 have been worked so as to avoid aerodynamic disturbances in operation downstream from the instrumentation member.

With reference to FIG. 6, there follows a description of an instrumentation member in an embodiment advantageously attached to an airfoil: the instrumentation member comprises a nozzle 48 having a cylindrical outer wall 54 in an axial direction 80, and including an orifice 52 at one of its axial ends, the orifice being defined externally by an axial rim 56 of the cylindrical wall, and extending with a funnel shape towards the inside of the nozzle along the axial direction 80. The funnel is connected to a channel 58 extending along the axis of the nozzle through the instrumentation member. At its axial end opposite from the orifice, the cylindrical wall 54 of the nozzle 48 is extended smoothly and without setbacks by the walls of the holder portion 50 that is formed integrally with the nozzle. The holder portion has two substantially-parallel main walls 60 and 62 extending facing each other and spaced apart by a diameter that is smaller than the diameter of the nozzle. In other circumstances, the two main walls 60 and 62 could be spaced apart by a distance that is greater than the diameter of the nozzle. Each of these main walls 60 and 62 is substantially of trapezoidal shape with bases 64 and 66 that are substantially parallel and united by sides 68 and 70. The main walls 60 and 62 join together along one of the sides 70 so as to form an edge face extending in a second direction 82, and they are attached via connection walls 72, 74, and 76 for the bases and for the remaining side. The nozzle 48 extends the holder portion from the edge face 70 where the main walls 60 and 62 join together so that this edge face 70 forms a shoulder of the cylindrical wall 54 of the nozzle for extending the leading edge of an airfoil, in such a manner that the edge face 70 extending along the second direction 82 is substantially perpendicular to the axis 80 of the nozzle and intersects that axis.

In an example shown in FIG. 7, the funnel-shaped fluid-taking orifice 52 of the instrumentation member 46 is extended by a channel 58 passing through the instrumentation member 46 and connected to the information-conveying channel 40 of the airfoil 22 that opens out into the cutout 44. This example is appropriate for measuring the pressure of the fluid. In another example shown in the same figure, these various channels have a cable 78 running therealong with one end of the cable being in the orifice 52 of the nozzle. By way of example, the cable 78 may serve to measure the temperature of the fluid taken by the nozzle 48.

It is particularly advantageous to form the entire instrumented airfoil as described above by an additive fabrication method, by laser melting, which method makes it possible to form the airfoil 22 and the instrumentation member 46 for subsequently attaching together to be formed in a single pass. This method also makes it possible to form the information-conveying channels within the airfoil easily and quickly. Nevertheless, it is possible to use other fabrication methods for making these elements, such as cutting them out from a mass of material.

It should be observed that although the figures show the instrumentation member installed on the leading edge of a turbine engine airfoil, in terms of constraints and technical advantages, it is also equivalent to install an equivalent instrumentation member at the trailing edge of the airfoil, it being possible for the airfoil to be located in a partial turbine engine module for use in testing, or in a compressor or a turbine on their own. Thus, the above-described invention clearly applies to these other possible embodiments.

The invention claimed is:

1. An instrumented airfoil for mounting in a flow passage of an item selected from a turbine engine turbine, compressor, and module of a turbine engine, which instrumented airfoil comprises:
    an airfoil defined in a lateral direction by a suction side wall and by a pressure side wall respectively, said walls joining together at ends in an axial direction via two respective lines extending in a direction that is substantially longitudinal so as to form respectively a leading edge and a trailing edge, the airfoil presenting a cutout extending axially from an item selected from the leading edge and the trailing edge, and laterally between the suction side wall and the pressure side wall, said cutout being delimited by a perimeter; and
    an instrumentation member that is attached to the airfoil and that includes an information-obtaining structure projecting from the cutout relative to one of the leading edge and the trailing edge, and a holder portion united with said information-obtaining structure and defined by an outer surface;
    wherein the holder portion is attached to the cutout so that said outer surface of the holder portion is in alignment respectively with the suction side wall, the pressure side wall, and one of the leading edge and the trailing edge of the airfoil in the vicinity of said outer surface, so that:
    the holder portion is limited by an edge which is continuously in contact with the whole cutout perimeter, along the suction side wall, the pressure side wall, and at least one of the leading edge and the trailing edge of the airfoil, and
    the airfoil and the holder portion are disposed without overlapping one another, even partially, in the lateral direction,
    with the transition between the airfoil and said holder portion thus not presenting any external setback.

2. The instrumented airfoil according to claim 1, wherein the airfoil includes a channel to convey information obtained by the information-obtaining structure, said channel being connected to the instrumentation member via the cutout.

3. The instrumented airfoil according to claim 2, wherein the cutout is formed in the leading edge of the airfoil, and the information-obtaining structure comprises a measurement nozzle to take a fluid from upstream of the leading edge of the airfoil.

4. The instrumented airfoil according to claim 3, wherein the measurement nozzle serves to obtain temperature information or pressure information relating to the fluid.

5. The instrumented airfoil according to claim 3, wherein the measurement information conveyed by the information-conveying channel is carried by the fluid taken by the measurement nozzle, which communicates freely with the information-conveying channel.

6. The instrumented airfoil according to claim 3, wherein the measurement information conveyed by the information-conveying channel is carried by an electric cable connected to the measurement nozzle.

7. The instrumented airfoil according to claim 3, wherein the holder portion of the instrumentation member is thinner than the measurement nozzle in the lateral direction of the instrumented airfoil.

8. The instrumented airfoil according to claim 1, wherein the instrumentation member is fastened in the cutout of the airfoil by one of: welding, brazing, and adhesive.

9. The instrumented airfoil according to claim 1, wherein the information-obtaining structure, which includes a measurement nozzle, and the holder portion are formed together as a single part, and the holder portion extends from an axial end of the measurement nozzle, forming:
 a shoulder with the measurement nozzle in a direction that is substantially perpendicular to said axis; and
 a portion of the leading edge of the instrumented airfoil.

10. A turbine engine turbine, compressor, or module, including an instrumented airfoil according to claim 1.

11. An instrumentation member comprising a measurement nozzle configured to take a fluid at a first axial end of the measurement nozzle, wherein a holder portion formed integrally with the measurement nozzle extends from a second axial end of the measurement nozzle so as to form a shoulder with the measurement nozzle in a direction that is substantially perpendicular to the axis, the holder portion being adapted to form a portion of the leading edge of the instrumented airfoil according to claim 1.

12. A method of making an instrumented airfoil, the method comprising:
 in an already-fabricated airfoil, cutting out a portion of the airfoil defined in a lateral direction respectively by a suction side wall and by a pressure side wall, these walls joining together at ends in an axial direction via two respective lines extending in a direction that is substantially longitudinal so as to form respectively a leading edge and a trailing edge, thereby obtaining a cutout extending axially from one of the leading edge and the trailing edge and extending laterally in full between the suction side wall and the pressure side wall said cutout being delimited by a perimeter;
 forming an instrumentation member to attach to the cutout and including an information-obtaining structure that is to project from the cutout relative to the leading edge or to the trailing edge, the instrumentation member further comprising a holder portion united with the information-obtaining structure and having a shape in the vicinity of the cutout that reproduces the shape of the portion that has been cut out from the airfoil; and
 attaching the instrumentation member to the airfoil by arranging the holder portion in the cutout in the airfoil in such a manner that externally in the vicinity of the cutout the holder portion reproduces the shapes of the cut-out portions of the suction side wall, of the pressure side wall, and of one of the leading edge and of the trailing edge that formed parts of the airfoil before the cutting-out step, so that:
 the holder portion is limited by an edge which is continuously in contact with the whole cutout perimeter, along the suction side wall, the pressure side wall, and at least one of the leading edge and the trailing edge of the airfoil, and
 the airfoil and the holder portion are disposed without overlapping one another, even partially, in the lateral direction.

13. A fabrication method according to claim 12, wherein the step of forming the instrumentation member comprises fabricating it by laser fusion.

14. A compressor including an instrumented airfoil according to claim 1.

15. A turbine engine module including an instrumented airfoil according to claim 1.

16. An instrumented airfoil for mounting in a flow passage of an item selected from a turbine engine turbine, compressor, and module of a turbine engine, which instrumented airfoil comprises:
 an airfoil defined in a lateral direction by a suction side wall and by a pressure side wall respectively, said walls joining together at ends in an axial direction via two respective lines extending in a direction that is substantially longitudinal so as to form respectively a leading edge and a trailing edge, the airfoil presenting a cutout extending axially from an item selected from the leading edge and the trailing edge, and laterally between the suction side wall and the pressure side wall, said cutout being delimited by a perimeter; and
 an instrumentation member that is attached to the airfoil and that includes an information-obtaining structure projecting from the cutout relative to one of the leading edge and the trailing edge, and a holder portion united with said information-obtaining structure and defined by an outer surface;
 wherein the holder portion extends one of the leading edge and the trailing edge of the airfoil and is attached to the cutout so that said outer surface of the holder portion is in alignment respectively with the suction side wall, the pressure side wall, and one of the leading edge and the trailing edge of the airfoil in the vicinity of said outer surface, so that:
 the holder portion is limited by an edge which is continuously in contact with the whole cutout perimeter, along the suction side wall, the pressure side wall, and at least one of the leading edge and the trailing edge of the airfoil, and
 the airfoil and the holder portion are disposed without overlapping one another, even partially, in the lateral direction,
with the transition between the airfoil and said holder portion thus not presenting any external setback.

\* \* \* \* \*